Feb. 18, 1930. H. N. PALMER 1,747,645
POTATO HARVESTER
Filed March 15, 1929 2 Sheets-Sheet 1
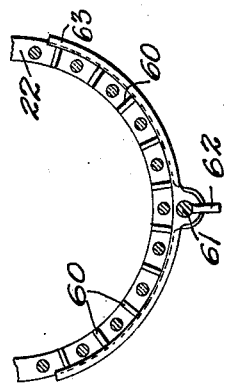
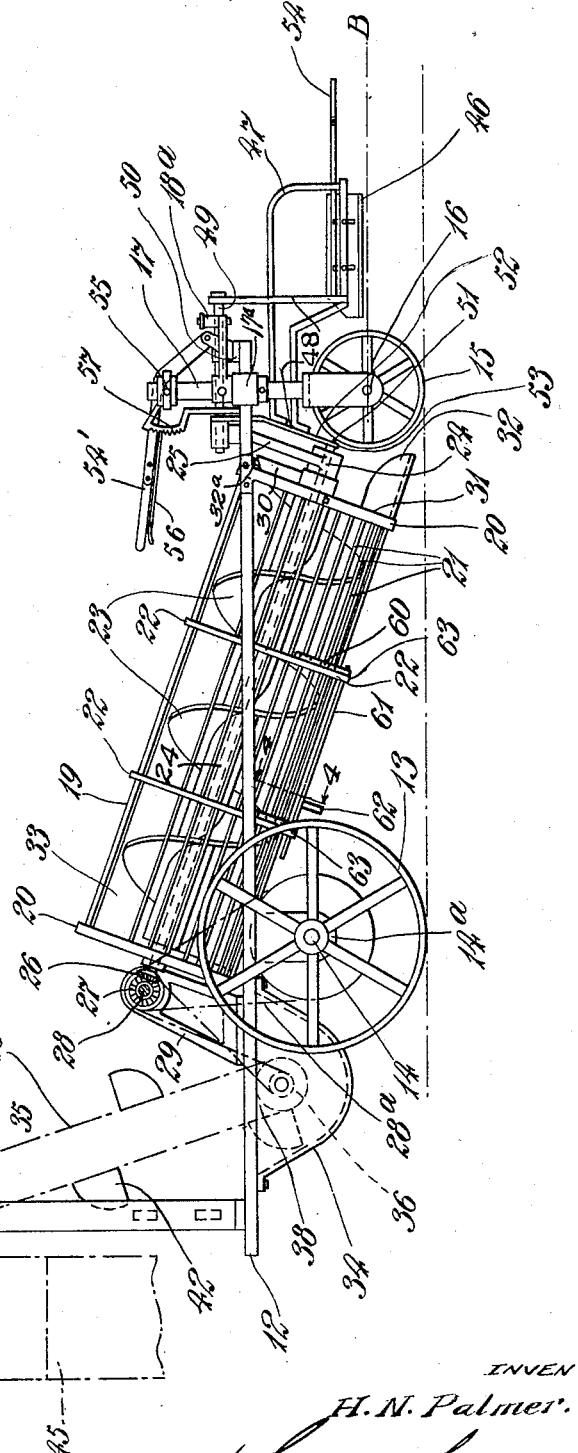
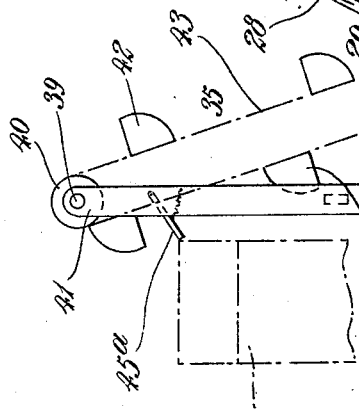
INVENTOR
H. N. Palmer.
By Lacey & Lacey,
Attys Feb. 18, 1930.　　　H. N. PALMER　　　1,747,645
POTATO HARVESTER
Filed March 15, 1929　　　2 Sheets-Sheet 2
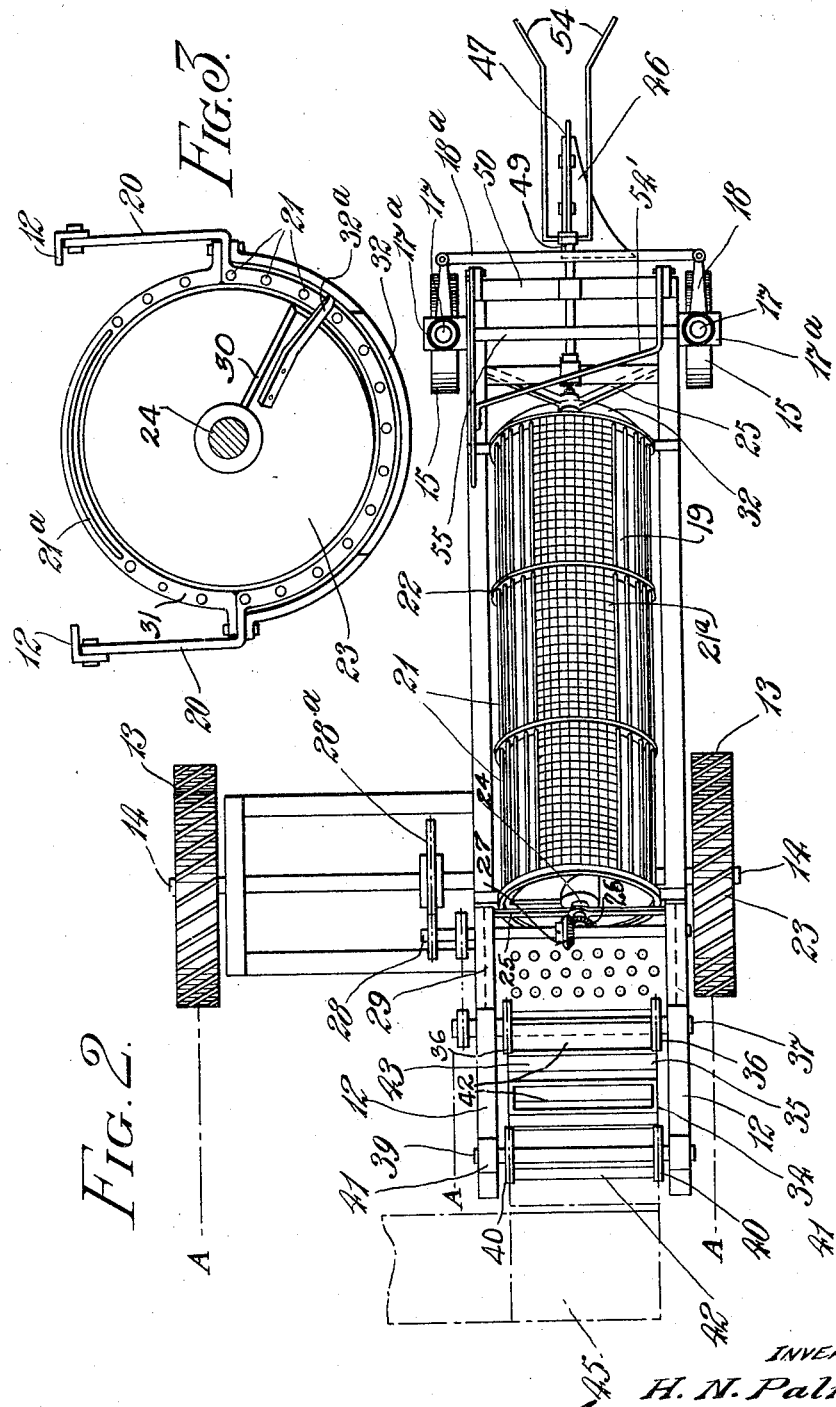

Patented Feb. 18, 1930

1,747,645

UNITED STATES PATENT OFFICE

HARRY NOEL PALMER, OF WISBECH, ENGLAND

POTATO HARVESTER

Application filed March 15, 1929, Serial No. 347,347, and in Great Britain March 13, 1928.

This invention relates to machines for gathering or harvesting potatoes or the like and has for an object to provide an improved construction of machine by which potatoes or the like may be collected or gathered directly from the ridges in which they are grown, freed from earth and delivered into a cart or other receptacle.

According to the invention, a cylindrical or other cage, or equivalent is mounted upon a wheeled frame or carriage and means such as a share is provided whereby potatoes or the like together with earth adhering thereto may be taken up from the ridge and fed into one end of the cage or equivalent, to be fed therethrough, by means such as an Archimedean screw device or equivalent conveying means, or by gravity or otherwise; the arrangement being such that as the potatoes or the like and adhering earth are fed through the cage the earth is broken or shaken away therefrom and falls back to the ground through the lower wall of the cage, so that the potatoes or the like are discharged finally from the cage or equivalent in a more or less clean condition. The cleaned potatoes discharged from the cage or equivalent may be elevated by means of a bucket or other conveyor and transferred thereby on to a chute by which they may be directed into a trailer or cart travelling alongside the machine.

In a preferred arrangement the cage or equivalent is arranged longitudinally of the machine and is inclined upwardly from the front to the rear, the potatoes or the like, together with the surrounding earth, being fed into the front and lower end of the cage by means of a share, whilst the cleaned potatoes discharged from the rear upper end of the cage are allowed to fall into a hopper from which they may be transferred to a chute by means of a bucket conveyor or the like as before described. In addition to the cage or equivalent, other operative parts of the machine, such for example, as the hopper and the conveyor buckets, may be perforated or otherwise constructed of any open-work form to ensure the effective separation of earth from the potatoes or the like.

A further feature of the invention resides in the provision of a stationary or oscillatory knife or other suitable cutting device in front of the share, in order to cut off the haulms or tops of the potatoes or the like; means being provided for diverting them laterally of the machine so that they are not carried into the cage or equivalent which might otherwise become choked.

A machine in accordance with one form of the invention is illustrated in the accompanying drawing, of which:

Figure 1 is a side elevation of the machine;
Figure 2 is a corresponding plan view,
Figure 3 is a fragmentary view of a detail.
Figure 4 is a detail section on the line 4—4 of Figure 1.

As shown in Figure 1, the frame 12 of the machine is provided with a pair of driving wheels 13 at the rear thereof, said wheels being mounted on an axle 14 supported by brackets 14$^a$ secured on the frame 12; the distance apart of these wheels 13 is preferably adjustable, so that the same may run in the bottom of the ridges as indicated by broken lines at A in Figure 2 and also to enable the wheels to span two adjacent ridges. The front of the machine is provided with a pair of steering wheels 15, which are set apart at a distance corresponding approximately to the width of one ridge; the steering wheels 15 are mounted on stub axles 16 and support vertical members or stems 17, which latter are supported in bearings 17$^a$ mounted on the frame 12; said wheels 15 being pivotally connected together by means of a lever 18 and a cross bar 18$^a$. If desired, a suitable steering wheel (not shown) may be employed.

A cylindrical cage 19 is mounted on the frame 12 of the machine by means of end members 20, which support a series of longitudinal iron slats or tubes 21 set at a determined distance apart so that earth separated from the potatoes may pass therebetween. Intermediate strengthening members 22 are also provided, and the end members 20 are mounted on the frame 12 in such a manner relatively to one another that the rear end of the cage will be higher than the front end thereof, said cage extending upwardly from a position somewhat below the level of the top of the ridge at the rear of the front or steering wheels 15 to a position above the frame and adjacent the rear of the driving wheels 13.

In order to feed potatoes upwardly through the cage an Archimedean screw 23 is mounted on a coaxial shaft 24 which is supported at each end of the cage by cross brackets 25, one of which is carried directly by the frame 12 whilst the other is supported by brackets 29 secured to the frame 12. The external diameter of the screw 23 is slightly less than the internal diameter of the cage, whilst the screw extends co-axially from end to end of the latter and is adapted to be rotated through the medium of the rear or driving wheels 13. In practice a two start or double screw is used, but a single start screw is shown in the drawings for the sake of clearness. Mounted on the upper end of the shaft 24 is a bevel gear wheel 26 which engages with a gear wheel 27 mounted on a cross shaft 28 carried in bearings on the brackets 29 on the frame 12, the cross shaft 28 being rotated by the ground wheels 13 through the medium of chain and sprocket gearing indicated at 28$^a$ which includes a clutch device (not shown) whereby said gearing 28$^a$ may be freed from the wheels 13.

The gearing described is so arranged that the Archimedean screw is rotated at such a speed in relation to the rate of travel of the machine that there is no possibility of the cage or equivalent becoming choked with potatoes.

In order to facilitate the feeding of potatoes and earth into the cage, the Archimedean screw or the like is arranged so that the front end 30 thereof extends somewhat beyond the front end 31 of said cage.

Mounted upon the frame 12 in a position in advance of the front lower end of the cage 19 is a share or like member 32, arranged to enter the ridge B and, during forward travel of the machine, to pick up the potatoes and direct them into the lower end of the cage 19, whence they are conveyed through the cage 19 by the screw 23. The share or like member 32 may extend into the cage in order to facilitate the delivery of the potatoes and earth into the latter. In order to keep the share 32 free from earth, a scraper or rib 32$^a$ is mounted on the screw 23 in such a manner that as the latter rotates it cleans the share of any earth adhering thereto.

It will be understood that as potatoes are fed upwardly through the cage 19, they are subjected to rubbing and agitation between the screw 23 and the slats or tubes 21, so that adhering earth is more or less completely separated from the potatoes and falls out of the cage 19 between the slats or tubes 21. Wire netting or the like 21$^a$ may be provided to close the top of the cage.

The Archimedean screw 23 is arranged to extend through the cage 19 to a point in the neighbourhood of the upper end 33 of the cage, the arrangement being such that the cleaned potatoes will be fed to the upper end of the cage 19 and discharged therefrom directly into a transverse trough or hopper 34 mounted on the underside of the frame 12. This trough or hopper 34 is preferably perforated in order to permit any earth still adhering to the potatoes to fall therethrough. If preferred the trough or hopper may be provided with a reciprocating riddle or the like, means being provided on the machine for agitating the riddle.

The cleaned potatoes or the like are discharged continuously into the trough or hopper 34, and thence into a cart or trailer (not shown) travelling alongside or behind the machine, by means of a chain and bucket conveyor 35 having sprocket wheels 36 and 40 mounted on transverse shafts 37 and 39 which are carried by bearings 38 and vertical brackets 41 respectively, mounted on the frame 12. The elevator bucket conveyor 35 is driven through the medium of chain and sprocket gearing mounted on the transverse shaft 37, and the cross shaft 28, the buckets 42 thereof being secured to chains 43 which engage the sprocket wheels 36 and 40. The elevator or bucket conveyor is rotated at a speed in suitable relation to the rate of travel of the machine and to the rotation of the Archimedean screw 23. As each bucket 42 of the conveyor 35 leaves the hopper 34 it is more or less filled with potatoes which it carries upwardly until it reaches a point in its rotation when the potatoes will be discharged therefrom on to a downwardly inclined chute 45, shown in dotted lines, carried in any suitable manner on the frame. The chute 45 is of such length as to permit of the potatoes being discharged therefrom into a cart or trailer travelling alongside the machine and may be mounted pivotally so as to permit delivery of cleaned potatoes at either side of the machine. In order to prevent potatoes falling on to the ground as they are discharged from the buckets 42 and to guide the potatoes into the chute, a platform 45$^a$ is pivotally mounted between the two vertical brackets or supports 41 and is spring influenced so as to be depressed by each passing bucket 42 and so as to return automatically to the position illustrated after the passage of each bucket. The buckets 42 and the chute 45 may be perforated, to assist in the complete removal of the earth from the potatoes.

The haulms or tops of the potatoes are cut off before the latter are gathered by means of an oscillatory or reciprocatory knife 46, which is mounted on the machine in a position in front of the share and supported by a framework 47 carried by arms or brackets 48, pivotally mounted at their upper ends on a longitudinal shaft 49 supported by transverse brackets 50. The oscillation of the knife 46 is brought about by means of a pin or extension 51, on the shaft 24 and which is adapted to engage in a slot or the like 52 formed in the lower end 53 of the rear bracket 48. Guide rods or irons 54, detachably connected to the frame, may be provided for gathering and guiding the haulms or tops to the knife 46 which may be two edged so as to cut on both sides of the haulms or tops of the potatoes.

The front of the frame may be raised in order to clear the share of the ridge by means of a double arm lever 54', mounted on the cross frame 50 and arranged to bear on a cross member 55 carried on the vertical members 17, spring controlled means 56 on said lever being provided for engaging a quadrant or the like 57 mounted on the main frame 12 and holding the frame in the raised position. Scrapers or like means may be mounted at the rear of the machine in any suitable manner for cleaning the ridges after the same have been dealt with by the share.

In order that earth adhering to the slats 21 of the cage 19 may be loosened or removed there are provided two arcuate rake members or head members 60 which partly surround the cage 19 at the underside thereof; the tines of the said rake members 60 projecting between the slats 21 and said members being carried by a shaft 61 which is slidable axially by means of a handle 62, in bearings 63, in the intermediate strengthening members 22 of the cage 19.

What I claim is:—

1. In a machine for gathering root crops, the combination with a carriage, of a cylindrical cage mounted upon and inclined upwardly towards the rear of the carriage, a share extending forwardly from the lower portion of the front end of the cage, an Archimedean screw conveyer rotatably mounted within the cage and extending longitudinally therethrough and projecting at its lower end beyond the corresponding end of the cage over the adjacent portion of the share, and a scraper attached to the projecting portion of the Archimedean screw conveyer for removing earth adhering to the share.

2. In a machine for gathering root crops, the combination with a carriage, of a cylindrical cage mounted upon and inclined upwardly towards the rear of the carriage, a share extending forwardly from the lower portion of the front end of the cage, an Archimedean screw conveyer rotatably mounted within the cage and extending longitudinally therethrough and projecting at its lower end beyond the corresponding end of the cage over the adjacent portion of the share, and a perforated hopper at the rear end of the cage receiving the roots from the rear end of the cage, and a bucket conveyer for elevating the roots from said hopper for delivery at the side of the machine.

3. A machine for gathering root crops comprising a carriage, a cylindrical cage mounted upon the carriage and consisting of a circular series of longitudinally extending slats spaced circumferentially of the cage, and a rake device comprising a shaft slidably mounted on the bottom of the cage to move longitudinally of the same, arcuate head members carried by the ends of the shaft and tines projecting from the heads into the spaces between the slats of the cage.

In testimony whereof I have hereunto signed my name.

H. N. PALMER.